United States Patent [19]

Imamura

[11] 4,378,003
[45] Mar. 29, 1983

[54] INTERNAL COMBUSTION ENGINE

[76] Inventor: Yoshio Imamura, 12-8, Higashicho, Fujinomiya-shi, Shizuoka-ken, Japan

[21] Appl. No.: 225,816

[22] Filed: Jan. 16, 1981

[30] Foreign Application Priority Data

Nov. 14, 1979 [JP] Japan ................................ 54-147255

[51] Int. Cl.³ .......................................... F02M 25/06
[52] U.S. Cl. ..................................... 123/568; 123/586
[58] Field of Search .............. 123/323, 327, 376, 386, 123/568, 587, 586, 589

[56] References Cited

U.S. PATENT DOCUMENTS

| 3,577,727 | 5/1971 | Warren et al. | 123/323 X |
| 4,014,303 | 3/1977 | Aiti | 123/586 X |
| 4,054,156 | 10/1977 | Benson | 123/323 X |
| 4,093,046 | 6/1978 | Perr | 123/323 X |

Primary Examiner—William A. Cuchlinski, Jr.
Attorney, Agent, or Firm—Pollock, Vande Sande & Priddy

[57] ABSTRACT

An internal combustion engine having first valve means disposed in the exhaust system and adapted to impart a resistance to the flow of exhaust gas to control the flow rate of the latter, and second valve means provided in the intake passage of said engine and adapted to introduce fresh air to the intake passage when r.p.m. of the engine has reached a predetermined value. During operation of the engine, a part of the exhaust gas is made to return into the combustion chamber due to the resistance imparted by the first valve means, and the unburned hydrocarbons in the exhaust gas returned to the combustion chamber are efficiently burned by the presence of fresh air which is introduced through the second valve means. Thus an improved internal combustion engine which can operate at a much improved fuel economy and which can minimize the emission of unburned hydrocarbons to the atmosphere is obtained.

2 Claims, 2 Drawing Figures

INTERNAL COMBUSTION ENGINE

BACKGROUND OF THE INVENTION

The present invention relates to an internal combustion engine and, more particularly, to an improved internal combustion engine which can operate at a much improved fuel economy and which can minimize the emission of unburned hydrocarbons to the atmosphere.

In view of the current international situation of oil resources, there is an increasing demand for more economical use of fuel by internal combustion engines. On the other hand, there is a demand for prevention of pollution caused by exhaust emissions from these engines.

Various proposals have been made hitherto for simultaneously achieving the reduction of fuel consumption of internal combustion engines and prevention of pollution caused by the exhaust emissions from the same.

Some of these proposals, however, require complicated devices, while the other are generally expensive.

SUMMARY OF THE INVENTION

It is, therefore, a principal object of the invention to provide an improved internal combustion engine which can operate at a much improved fuel economy and in which emission of unburnt hydrocarbons to the atmosphere is avoided effectively by merely attaching a simple device to existing internal combustion engines, especially to automotive engines.

To this end, according to the invention, there is provided an internal combustion engine having the following features. Namely, in the internal combustion engine of the invention, first valve means is disposed in the exhaust system at a suitable portion of the latter, e.g. at the outlet side of the tail pipe, in such a manner as to impart a resistance to the flow of the exhaust gas and to control the flow rate of the exhaust gas in response to the exhaust pressure. The engine further includes second valve means provided in the intake passage of said engine and adapted to introduce fresh air into intake passage interconnecting a carburetor and the engine when r.p.m. of the engine has reached a predetermined value.

In the exhaust stroke of the engine, the first valve means imparts a resistance to the flow of the exhaust gas to control the flow rate of the latter, so that a certain amount of the exhaust gas is returned into the combustion chamber of the engine. In the subsequent suction stroke of the engine, fresh air is sucked through the second valve means provided in the intake passage and is induced into the combustion chamber together with the air-fuel mixture coming from the carburetor. The mixture and the fresh air are then mixed in the combustion chamber with the exhaust gas including a certain amount of unburned hydrocarbons returned to the latter to form combustible mixture, which then is compressed and ignited to be burned in the combustion chamber. It is to be noted that, thanks to the induction of the fresh air from the outside, the unburnt hydrocarbons residing in the exhaust gas returned to the combustion chamber are burned efficiently. In consequence, the unburned hydrocarbon in the exhaust gas, which is emitted to the atmosphere in the conventional engine, is effectively burned to contribute to a remarkable reduction of the fuel consumption rate and to decrease the emission of unburned hydrocarbons to the atmosphere.

The above and other objects, as well as advantageous features of the invention will become clear from the following description of the preferred embodiment taken in conjunction with the accompanying drawings.

DESCRIPTION OF THE PREFERRED EMBODIMENTS

Figure 1:
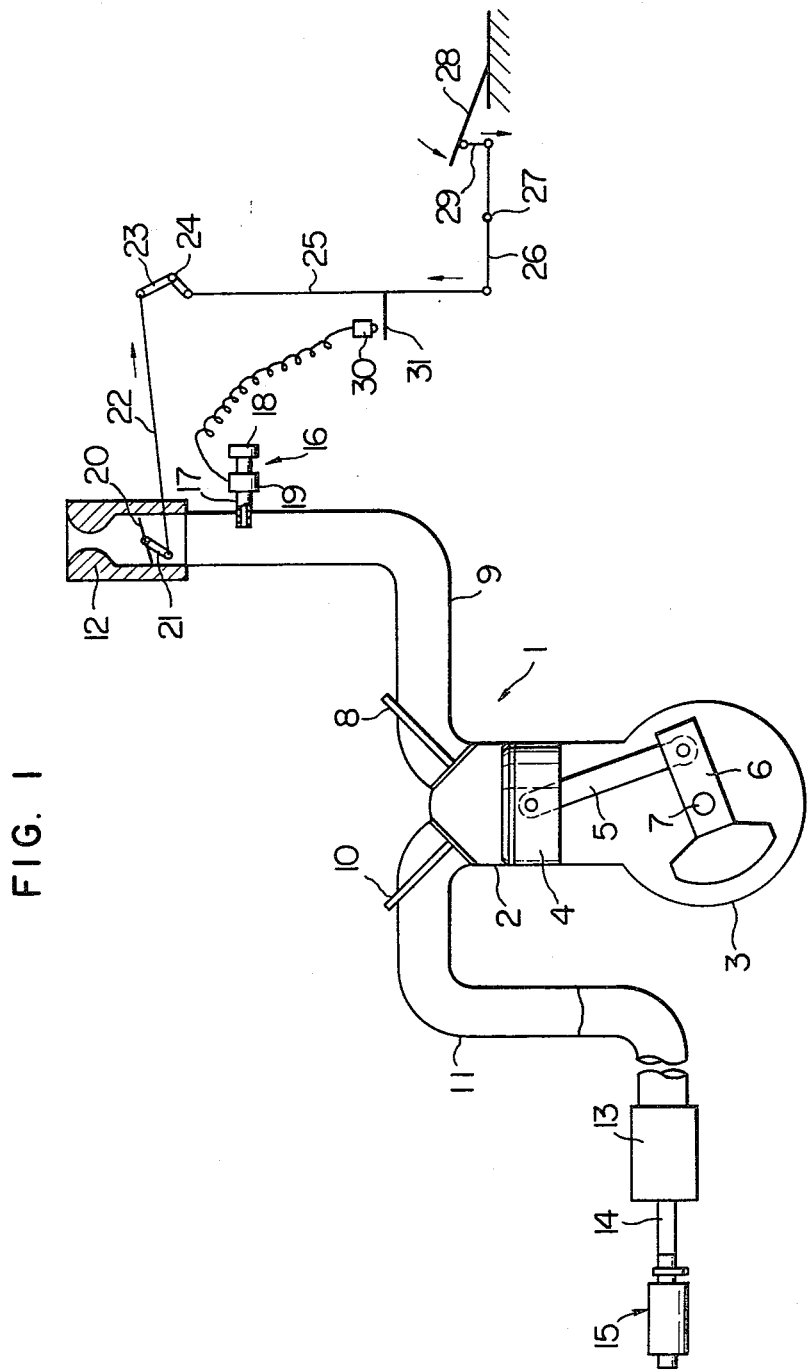
FIG. 1 is a schematic illustration of an internal combustion engine constructed in accordance with a preferred embodiment of the invention.

Referring first to FIG. 1, an internal combustion engine constructed in accordance with a preferred embodiment of the invention is generally designated at a reference numeral 1. The engine 1 has, as well known, a cylinder 2, crank case 3, piston 4, connecting rod 5, crank 6, crank shaft 7, intake valve 8, intake pipe 9, exhaust valve 10 and an exhaust pipe 11. The intake pipe 9 is connected to a carburetor 12, while the exhaust pipe 11 is provided with a muffler 13 and a tail pipe 14.

First valve means 15 are provided at the outlet of the tail pipe 14 and second valve means 16 are provided in the intake pipe 9.

The second valve means 16 include a pipe 17 attached to the side of the intake pipe 9 and forming a port for introducing fresh air into the intake pipe 9, a filter 18 being provided at the outer end of the pipe 17 and an electromagnetic valve 19 for opening and closing said port arranged intermediate of said pipe.

A throttle valve 20 is pivotally connected through a throttle lever 21 to one end of a first rod 22, the other end of which is pivotally connected to one arm of a bell crank 23. The bell crank is rotatably supported by a pivot 24 fixed to a portion of a body of an automobile, the other arm thereof is pivotally connected to one end of a second rod 25. The other end of the second rod 25 is pivotally connected to one end of a third rod 26 which has its fulcrum about a portion of the body at point 27. The other end of the third rod 26 is pivotally connected to an accelerator pedal 28 by means of a pedal rod 29. Springs for respectively urging said throttle valve 20 to its closed position and said accelerator pedal 28 to its rest position are omitted from the figure for the sake of brevity. A microswitch 30 is fixedly supported by a portion of the body and electrically connected to the electromagnetic valve 19 as shown in the figure. An actuating arm 31 is attached to the side of the second rod 25.

Figure 2:
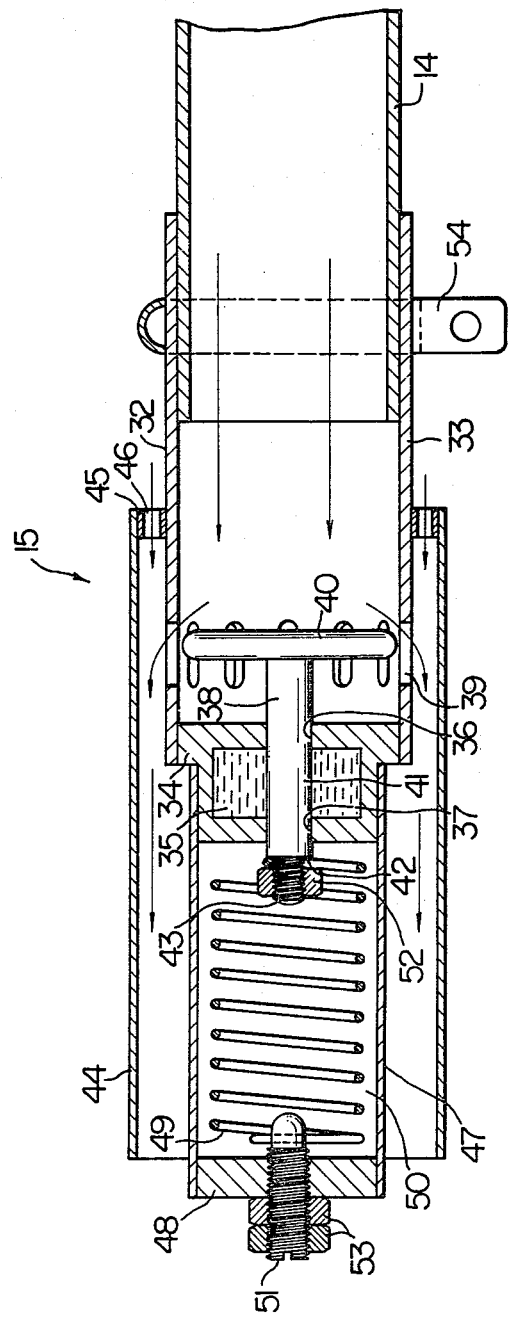
FIG. 2 is an enlarged sectional view of first valve means incorporated in the engine shown in FIG. 1.

The first valve means 15 of the embodiment have, as shown in FIG. 2, a valve casing 32 having a tubular portion 33 the inner diameter of which is slightly larger than the outer diameter of the tail pipe 14 and a valve holder 34 closing one end of the tubular portion and integrally provided with a cup shaped oil chamber 35. Axially aligned central holes 36 and 37 are formed in the adjacent walls of said valve holder through which a valve 38 is slidably received. 12 elliptical holes 39 circumferentially spaced with each other are formed in the tubular portion 33 at a position near the valve holder. The valve 38 has a head 40 having a diameter slightly smaller than the inner diameter of said tubular portion 33, and a stem 41 provided with a shoulder 42 and a threaded portion 43. An outer tube 44 is secured on the outer periphery of the tubular portion 33 at a position intermediate of its length by means of an annular member 45 fixed to the end of said outer tube. Many circumferentially spaced axial holes 46 are formed in said annular member 45. An inner tube 47 is secured at its one end to the periphery of the oil chamber 35, and is closed at the other end by an end plate 48. A spring 49 is arranged in a chamber 50 defined by the inner tube 47, end plate 48 and the lefthand end wall of the valve holder 34.

The left hand end of the spring 49 is secured, by any suitable means, to the inner end of an adjusting screw 51 which is screwed to a mating threaded hole formed in said end plate 48. The other end of the spring is firmly clamped between the shoulder 42 of the valve stem 41 and a nut 52 threaded onto the threaded portion 43 of the valve stem. The position of the valve head 40 with respect to the 12 elliptical holes 39 is adjusted by means of the adjusting screw 51 to a position as shown in FIG. 2, i.e. the space in the valve casing 32 at the right side of the valve head is in communication with part of areas of the elliptical holes 39. After the adjustment, said adjusting screw is fixed to the end plate 48 by means of nuts 53. Since the valve 38 is freely rotatable in the central holes 36 and 37 of the valve holder, no torsional stress is applied to the spring 49 during the adjustment. It should be noted that the spring 49 is directly connected to the adjusting screw and to the valve stem without using any spring receiver or receivers and the spring is freely arranged in the chamber 50 such that it can act both as a compression spring and as a tension spring.

The oil chamber 30 is filled with a heat-resistant oil such as silicon oil. The first valve means 15 having the above-mentioned construction is assembled as a unit and fitted over the end of the tail pipe 14 and fixed thereto by means of a clamp band 54.

The operation of the engine embodying the present invention shown in FIGS. 1 and 2 will now be described.

The electromagnetic valve 19 of the second valve means 16 is normally kept in its closed position.

Since the second valve means 16 for introducing fresh air into the intake pipe 9 is closed, and since the space in the first valve means 15 to the right side of the valve head in communication with the interior of the tail pipe 14 opens to the atmosphere through partially opened elliptical holes 39 and an annular space between the outer tube 44 and the outer periphery of the tubular portion 33 of the valve casing and the inner tube 47, the starting and idling operations of the engine are carried out in the usual manner.

When the accelerator pedal 28 is depressed as shown by an arrow, the third and second rods 26, 25 move as shown by arrows, and thus the bellcrank 23 is rotated clockwise. This moves the throttle valve 20 through the throttle lever 21 and first lever 22 toward its open position. When the r.p.m. of the engine has reached a predetermined value, for example, 1000 r.p.m., which is set in accordance with the characteristics of the particular engine to be used, the actuating arm 31 attached to the second rod 25 engages normally open microswitch 30 to close it. By the closing of the switch 30, the electromagnetic valve 19 is energized to open same, and therefore, fresh air is introduced into the intake pipe through the filter 18 and the pipe 17 by the action of vacuum present in the intake pipe.

Simultaneously, the valve 38 of the first valve means 15 is shifted toward the left as viewed in FIG. 2 by the pressure of exhaust gas against the force of the spring 49, and exhaust gas from the tail pipe flows as shown by arrows through the holes 39 and the annular space between the outer and inner tubes 44 and 47 and discharged to the atmosphere. At this stage, air is sucked through the axial holes 46 and mixed with the exhaust gas flowing through the annular space. This contributes to prevent temperature rise of the first valve means 15 and the operation of noise caused by the exhaust gas flow.

Since the spring 49 is freely supported in the chamber 50, i.e., it can act both as a compression spring and a tension spring, the pulsation of the exhaust gas flow acting on the valve head 40 is dampened, and since said spring 49 is directly connected to the end of the valve stem at a position spaced a suitable distance from the end wall of the valve holder 34 without using a spring receiver, no chattering noise is generated as in the case when a compression spring with a spring receiver which may collide against the end wall of the valve holder by the pulsation of the exhaust gas, is used in lieu of the spring 49.

The function of the first valve means 15 is to apply appropriate resistance to the exhaust gas from the tail pipe.

As the engine is accelerated above 1000 r.p.m. since a suitable level of load below 2 Kg selected according to the characteristics of a particular engine to be used is imparted in the first valve means by means of the spring 49, a certain amount of exhaust gas is forcibly returned into the combustion chamber of the internal combustion engine in the exhaust stroke. In the suction stroke, the second valve means 16 are held in the opened state so that fresh air is taken into the intake pipe 9 through the pipe or port 17 and is induced together with the air-fuel mixture coming from the carburetor 12 into the combustion chamber. The fresh air and the air-fuel mixture thus introduced into the combustion chamber are mixed with the exhaust gas residing in the latter to form a combustible mixture. It is to be noted that the air-fuel mixture coming from the carburetor 12 is conveniently heated by the heat of the exhaust gas so that the evaporation of the fuel is promoted.

The mixture thus formed is then compressed and ignited to be burned. The unburned hydrocarbons in the resideual exhaust gas are burned in a good manner together with the mixture thanks to the presence of oxygen contained in the fresh air induced into the combustion chamber through the second valve means.

Then, as the engine is further accelerated, the valve 38 of the first valve means 15 is further shifted to the left to open the elliptical holes 39 overcoming the force of the spring 49 due to the increased dynamic pressure of the exhaust gas.

According to the invention, a remarkable reduction of fuel consumption rate is achieved simply by attaching the first and second valve means to existing engines.

A first valve means as shown in FIG. 2 and a second valve means as shown in FIG. 1 were installed in a 2000 cc engine of an automobile type name "Gloria" of the Nissan Motor Co., Ltd. of 1979 year type provided with automatic transmission, and now under test running. It has been already found that in urban running, said autmobile had a fuel consumption of about 6 to 7 kilometers per liter of fuel, but after installation of said first and second valve means, the fuel consumption thereof is remarkably improved as shown below.

| test No. | fuel consumed | running distance | fuel consumption ratio |
| --- | --- | --- | --- |
| 1 | 62 liters | 496 Km | about 8 Km/l |
| 2 | 58 liters | 508 Km | about 8.8 Km/l |

This is attributable to the fact that the unburned hydrocarbon in the exhaust gas returned to the cylinder during the low and medium load operations which are most frequent in normal state of use of automobile are efficiently burned by the assistance of fresh air introduced through the second valve means, and that the heat possessed by the residual exhaust gas conveniently promotes the evaporation of the fuel.

Hitherto, it has been considered that the provision of a resistance in the exhaust system is not desirable because it was believed to hinder combustion considerably.

It is remarkable that, according to the invention, no trouble such as stalling of the engine due to ignition failure or the like is caused at all, even when the first valve means imparts considerable resistance, because the level of the load imposed on the first valve means is selected suitably below 2.0 Kg according to the characteristics of the particular engine to be used and because a suitable amount of fresh air also proportional to the characteristics of the engine is introduced into the intake passage through the second valve means. This has been confirmed by the inventor through test running.

Smooth engine operation is ensured also during heavy load operation because, in this state, the first valve means are kept almost fully opened due to the increased dynamic pressure of the exhaust gas, and therefore the amount of exhaust gas returned into the combustion chamber reduces, while the ratio of the amount of the fresh air introduced into the intake pipe through the second valve means with respect to the amount of air fuel mixture introduced in the cylinder is reduced because of reduction of vacuum in the intake pipe.

Although the invention has been described through its preferred form, it is to be noted that the embodiment shown in FIGS. 1 and 2 is only for the purpose of illustrating the invention, and various changes and modifications may be imparted thereto without departing from the scope of the invention. Since the described embodiment is directed to the first and second valve means which can be readily attached to existing engines, the first valve means are installed at the outlet of the tail pipe. But said first valve means may be installed at any desired portion in the exhaust system, such as a portion of the exhaust pipe 11, muffler 13 or the tail pipe 14 by suitably modifying the construction thereof.

Also with regard to the control of the second valve means, many modifications are applicable to the present invention. For example, a diaphragm means may be used for controlling the first valve means, in which one chamber of the diaphragm means is connected to the exhaust gas system through a pipe to introduce exhaust gas pressure to said chamber to operate a valve in response to variation of the exhaust gas pressure, or a pressure senser may be provided in the exhaust system and connected to a first valve means through a computer for controlling the operation of the valve means.

What is claimed is:

1. In an internal combustion engine having fuel-air intake means and exhaust gas means, the improvement comprising:
    a casing including a tubular member encircling and attached to a tailpipe enclosed in said exhaust gas means;
    a valve holder closing one end of said tubular member, and a plurality of circumferentially spaced, axially extending apertures formed in said tubular member at a position near said valve holder;
    a poppet valve which is supported at its stem by said valve holder such that said valve is slidable in the axial direction and rotatable with respect to said valve holder and with its head having a diameter slightly smaller than the inner diameter of said tubular member and positioned axially in the area of said apertures;
    an outer tube secured on the outer periphery of said tubular member at a position intermediate of its length by means of an annular member having a plurality of circumferentially spaced axial holes and fixed to the end of said outer tube;
    an inner tube secured at its one end to the periphery of the valve holder and enclosed at its other end by an end plate;
    an adjustable screw secured to a mating threaded hole formed in said end plate; and a spring disposed in a chamber defined by said inner tube by said end plate and by an end surface of said valve holder, one end of said spring being secured to the inner end of said adjustable screw and the other end of said spring being secured to the end of the stem of said poppet valve;
    second valve means for variably controlling the amount of fresh air admitted into said fuel-air intake means; and,
    means responsive to a manifestation dependent upon the rotational speed of the engine for introducing fresh feed into said intake means,
    whereby the unburnt hydrocarbons in the exhaust gas which have been returned into the combustion chamber of the engine as a result of the resistance applied by the poppet valve and spring are more effectively burnt in the combustion chamber as a result of the fresh air introduced through said second valve means.

2. An internal combustion engine as claimed in claims 1 in which said second valve means comprises a pipe forming a port for introducing fresh air into said intake means, an electromagnetic valve arranged in said pipe for opening and closing said port, switch means connected to said electromagnetic valve, and means for actuating said switch means comprising linkage means operatively connecting the throttle valve of the engine to the accelerator pedal of a vehicle installed with said engine.

* * * * *